United States Patent [19]

Mason

[11] 4,214,193
[45] Jul. 22, 1980

[54] DIGITAL SERVO ANTI-HUNT CIRCUIT

[75] Inventor: Martin K. Mason, West Newbury, Mass.

[73] Assignee: Hewlett-Packard Company, Palo Alto, Calif.

[21] Appl. No.: 949,486

[22] Filed: Oct. 10, 1978

[51] Int. Cl.² ............................................. G05B 5/01
[52] U.S. Cl. ..................................... 318/611; 318/603
[58] Field of Search ............... 318/611, 603, 630, 631

[56] References Cited

U.S. PATENT DOCUMENTS

| | | | |
|---|---|---|---|
| 3,995,208 | 11/1976 | Parr | 318/611 X |
| 4,051,423 | 9/1977 | Touchton et al. | 318/611 |
| 4,096,426 | 6/1978 | Tremaine et al. | 318/611 |
| 4,139,811 | 2/1979 | Klinger | 318/611 X |

Primary Examiner—B. Dobeck
Attorney, Agent, or Firm—Donald N. Timbie

[57] ABSTRACT

A digital servo system is described in which hunting that would be caused by restoring torque due to resilient coupling to a load is prevented by preventing the transfer of information from the error register to the D/A converter controlling the motor.

1 Claim, 3 Drawing Figures

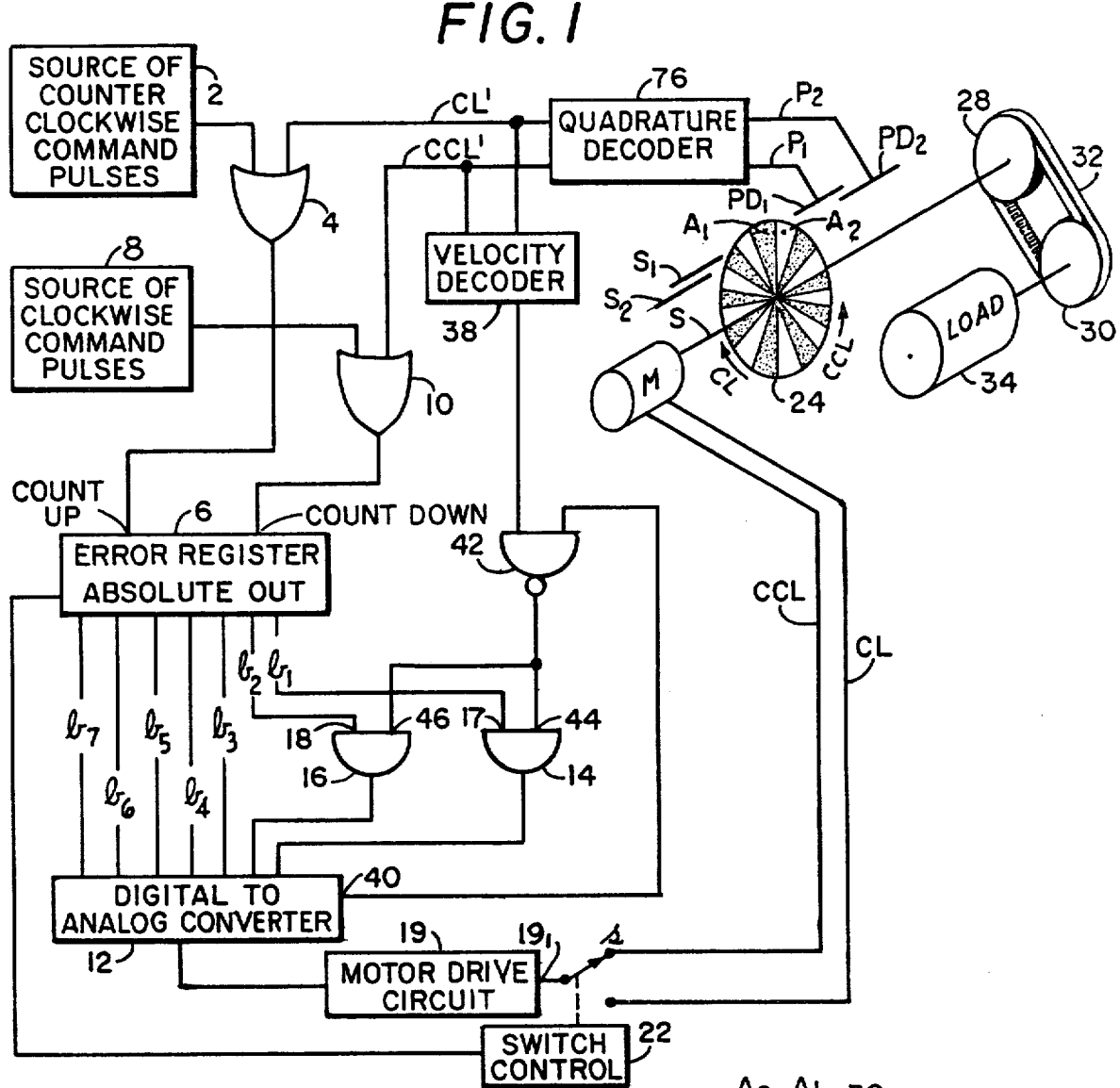
FIG. 1
FIG. 1B
```
_ _ _ _  1 1 1 1
_ _ _ _  1 1 1 0
_ _ _ _  1 1 0 1
_ _ _ _  1 1 0 0
_ _ _ _  1 0 1 1
_ _ _ _  1 0 1 0
_ _ _ _  1 0 0 1
_ _ _ _  0 0 0 0 — Z
_ _ _ _  0 0 0 1 — E
_ _ _ _  0 0 1 0 — E'
```
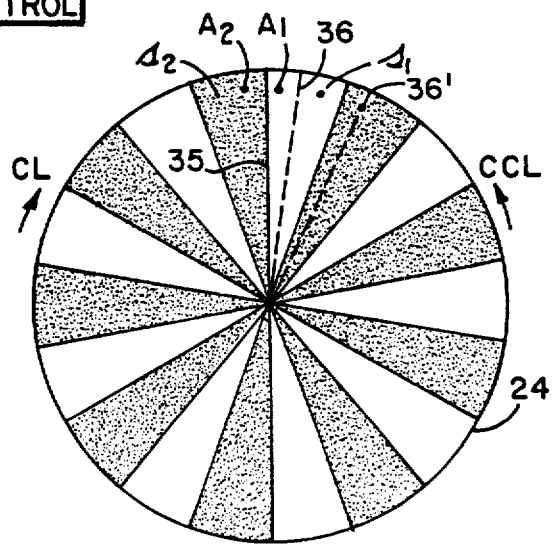
FIG. 1A

DIGITAL SERVO ANTI-HUNT CIRCUIT

BACKGROUND OF THE INVENTION

Rotation of a shaft of a motor through a desired number of angular increments can be effected by increasing the count in an error register with a number of pulses equal to the number of angular increments through which the motor is to be rotated and decreasing the count in the error register by one each time a motor passes through an angular increment. The angular increments through which the motor passes can be determined by noting when markers that rotate with the motor pass through a given reference point. The net absolute count in the error register is transferred to a D/A converter and a voltage proportional to its output is applied to the motor. When the net count reaches zero, no voltage is applied to the motor. If the system is critically damped or other control means are provided, the motor will come to rest just after turning through the last angular increment. However, when the system has some degree of elasticity combined with some static friction, such as would occur, for example, if the motor were coupled to its load by a rubber belt, a restoring force exists that may rotate the motor in the opposite direction after it has reached the desired position and cause a marker of an angular increment to pass back through the reference point. This introduces a count into the error register that reverses the rotation of the motor and causes the marker to pass again through the reference point in the original direction. The process can be repeated so as to produce hunting that causes an audible hum and consumes power.

BRIEF DISCUSSION OF THE INVENTION

In accordance with this invention, when the motor is at rest and the D/A converter has zero count, the transfer of the lower significant bit or bits from the error register to the D/A converter is disabled so as to effectively create a dead band in the servo loop. Thus, when the elastic restoring force causes a marker indicating an angular increment to pass back through the reference point, the count thus introduced into the error register is not transferred to the D/A converter and no voltage is applied to the motor. The motor stays in the angular position into which it is turned by the restoring force until new command pulses are applied to the error register.

THE DRAWINGS

FIG. 1 is a schematic drawing of a digital servo system incorporating the invention;

FIG. 1A is a partial view of the disc of an encoder used in FIG. 1; and

FIG. 1B illustrates the digital count that may be stored in the error register of the servo system of FIG. 1.

DIGITAL SERVO SYSTEM

Although the invention could be used with various digital servo systems, the servo system shown in the drawing is comprised of a source 2 of counterclockwise command pulses that is coupled via an OR gate 4 to the "count up" input of an error register 6 and a source 8 of clockwise command pulses that are coupled via an OR gate 10 to the "count down" input of the error register 6. The bits respectively at the outputs $b_1$ through $b_7$ of the error register 6 represent the absolute value of the difference between the number of pulses applied to the "count up" and "count down" inputs of the error register 6. In this particular illustration, the higher significant bits $b_3$ through $b_7$ are respectively and directly transferred to inputs of a D/A converter 12. In accordance with the invention, the bits $b_1$ and $b_2$ of lower significance may be respectively transferred to inputs of the D/A converter 12 via AND gates 14 and 16. The bits $b_1$ and $b_2$ are respectively applied to the inputs 17 and 18 of the AND gates 14 and 16, and their outputs are respectively connected to the lower bit inputs of the D/A converter 12. The D/A converter 12 applies a voltage to a motor drive circuit 19 that increases in magnitude with the count actually transferred from the error register 6 to the D/A converter 12. The drive circuit 19 supplies a corresponding voltage that is suitable for driving a motor M at its output 19'. If the motor M is to turn in a counterclockwise direction, the output 19' is connected by a switch s to a lead CCL that applies it to windings, not shown, in the motor M for rotating it counterclockwise. If the motor M is to rotate in the clockwise direction, the output 19' is connected by the switch s to a lead CL that applies it to a winding, not shown, in the motor M for rotating it in a clockwise direction. The position of the switch s is determined by connecting a terminal 20 of the error register 6 to a switch control circuit 22. The terminal 20 has one polarity when the error count is positive and the other polarity when the error count is negative. With the particular configuration shown, the error signal is positive when the command signal from the source 2 calls for a counterclockwise rotation and negative when the command signal from the source 8 calls for a clockwise rotation.

In order to determine the number of angular increments through which the motor M actually rotates in either direction, a disc 24 having alternate opqaue and transparent sectors is mounted on the shaft S of the motor M so as to rotate therewith. Each pair of consecutive sectors represents one angular increment through which the motor M is to be controllably rotated. For purposes of illustration, only a few sectors are shown, but in actual practice, the number of pairs of sectors is much greater in order to increase the precision with which the rotational position of the motor M can be set. A source $S_1$ of a beam of light and a photodetector $PD_1$ are mounted on opposite sides of the disc 24 at a given point $A_1$. Each time a transparent sector of the disc 24 passes between the source $S_1$ and the photodetector $PD_1$, an output pulse $P_1$ is applied to one input of a quadrature decoder 26. A source $S_2$ of a beam of light and a photodetector $PD_2$ are mounted on opposite sides of the disc 24 at a point $A_2$ that is angularly displaced from the point $A_1$ by one-half of a sector. Each time a transparent sector of the disc 24 passes between the source $S_2$ and the photodetector $PD_2$, a pulse $P_2$ is applied to another input of the quadrature decoder 26. In response to the pulses $P_1$ and $P_2$, the quadrature decoder 26 outputs a pulse only on a lead CCL' each time the disc 24 rotates through one angular increment of two sectors in a counterclockwise direction and a pulse only on lead CL' each time the disc 24 rotates through one angular increment of two sectors in a clockwise direction. The lead CL' is connected to an input of the OR gate 4 and the lead CCL' is connected to an input of the OR gate 10.

The general operation of the servo system as thus far described is as follows. If it is desired to rotate the motor M in a counterclockwise direction through n angular increments, the source 2 provides n pulses in sequence to one input of the OR gate 4 causing it to output corresponding pulses to the "count up" input of the error register 6. This count is transferred in digital form to the D/A converter 12 which in turn causes the motor drive circuit 19 to output a voltage at 19'. This count being up, the voltage at the terminal 20 of the error register 6 is positive so as to cause that switch control 22 to connect the switch s to the line CCL and cause the motor M to rotate counterclockwise. As the sectors of the disc 24 pass through the points $A_1$ and $A_2$ so as to produce pulses $P_1$ and $P_2$ at the input of the guadrature decoder 26, it outputs pulses on the lead CCL' that are applied via the OR gate 10 to the "count down" input of the error register 6. When the number of pulses so applied reaches n, the digital output of the error register 6 is zero and the output voltage supplied by the D/A converter 12 to the motor drive circuit 19 also becomes zero so that no voltage is applied to the motor M.

Similarly, if it is desired to rotate the motor M in a clockwise direction by n angular increments, the source 8 supplies n pulses in sequence to the "count down" input of the error register 6 via the OR gate 10. This count is transferred in digital form to the D/A converter 12 which in turn causes the motor drive circuit 19 to output a voltage at 19'. This count being down, the voltage at the terminal 20 of the error register 6 is negative so as to cause the switch control 22 to connect the switch s to the line CL and cause the motor M to rotate clockwise. As each pair of sectors of the disc 24 passes through the points $A_1$ and $A_2$, pulses $P_1$ and $P_2$ are applied to the quadrature decoder 26, and it outputs a pulse via the lead CL' to an input of the OR gate 4, causing it to apply a pulse to the "count up" input of the error register 6. When n pulses have been so applied, the digital output of the error register 6 becomes zero and the output voltage supplied by the D/A converter 12 to the motor drive circuit 19 also becomes zero, so that no voltage is applied to the motor M.

If the servo system is critically damped, or a suitable control means are provided, the motor M will come to rest just after the nth pulse has been supplied by the quadrature decoder 26 on either lead CCL' or lead CL', as the case may be. In some apparatus, however, a certain amount of restoring torque is exerted on the shaft S so as to reverse its direction of rotation after it comes to rest through an angular amount determined by the magnitude of the restoring torque. For example, if the shaft S is connected to a pulley 28 that drives a pulley 30 via a rubber belt 32, and if a load 34 with some static friction is connected to the shaft of the pulley 30, it will be found that the shaft of the motor M will be turned through a small angle in a direction opposite to that in which it had just been turning after it reaches the desired position. It should be understood that this action is due to the elastic nature of the drive system and can occur even though the servo system operates properly.

A more detailed understanding of how the hunting previously referred to comes about can be obtained by considering the view of the disc 24 shown in FIG. 1A. Assume that the servo system described has just rotated the disc 24 in a counterclockwise direction indicated by the arrow CCL and that it would cause rotation to cease when the dividing line 35 between the sectors $s_1$ and $s_2$ has just barely passed by the point $A_1$. Inasmuch as the point $A_2$ is angularly displaced from $A_1$ by one-half of a sector, it will be located just a little less than halfway through the sector $s_2$ as shown. When the dividing line 35 between the sectors $s_1$ and $s_2$ passed the point $A_1$, the nth pulse appeared on lead CCL' and was applied to the "count down" input of the error register 6 via the OR gate 10. This reduced the net count in the error register 6 to zero as indicated at Z in the digital count illustrated in FIG. 1B. Any elasticity in the mechanical system coupled with frictions associated with the load or preferred positions of the load may result in the load coming to rest displaced slightly from the desired position. Then, when the motor stops, any restoring torque due to elasticity in the mechanical system, such as may be provided by the rubber betl 32, will rotate the motor M and the disc 24 in a clockwise direction as indicated by the arrow CL, with the result that the dividing line 35 between the sectors $s_1$ and $s_2$ will rotate back through the point $A_1$ to a position such as indicated by the dotted line 36. When this occurs, the edge of a pulse $P_1$ is formed, and because of the now clockwise rotation of the disc 24, a pulse appears on the lead CL' so as to be applied to an input of the OR gate 4. It outputs a pulse to the "count up" input of the error register 6 so that it exhibits an erroneous count such as indicated at E in FIG. 1B. If this count is transferred to the $b_1$ input of the D/A converter 12, it will cause a voltage to be applied to the motor drive circuit 19. The voltage at the terminal 20 of the error register 6 causes the switch control 22 to make the switch s contact the lead CL so that the motor M will once again rotate in the counterclockwise direction. The process is then repeated so that the motor M hunts back and forth, causing the dividing line 35 between the sectors $s_1$ and $s_2$ to rotate back and forth between the position shown and that indicated by the dotted line 36.

The Invention

In order to prevent such hunting, means are provided for interrupting the transfer of the bits, preferably those of lower significance, from the error register 6 to the D/A converter 12 only when the motor M is nearly at rest and the count in the drive register is zero, a condition that exists only when the motor M has reached a desired angular position and no new commands are given by the sources 2 or 8.

Indication that the motor M is at rest may be obtained by connecting the inputs of a velocity decoder 38 to the leads CL' and CCL'. When the derivative of the rate of the pulses on these leads is zero, or when the pulses on the leads are pulsing alternately, as would occur during hunting, the motor M is essentially at rest and the output of the velocity decoder 38 is high.

Indication that the motor M has reached the desired position is provided by the existence of a high state at an output 40 of the D/A converter 12 whenever the count applied to the converter 12 from the error register 6 is zero.

The output of the velocity decoder 38 and the output 40 of the D/A converter 12 are respectively connected to the inputs of a NAND gate 42, and its output is respectively connected to inputs 44 and 46 of the AND gates 14 and 16. The other inputs 17 and 18 are connected, as previously described, to the bit outputs $b_1$ and $b_2$ of the error register 6.

Operation

Until the motor M has reached the position determined by the command pulses or is rotating at a velocity that is less than some small value, it is necessary that all output bits $b_1$ through $b_7$ at the output of the error register 6 be transferred to the corresponding bit inputs of the D/A converter 12. The bits $b_3$ through $b_7$ are directly transferred, but the bits $b_1$ and $b_2$ must respectively pass through the AND gates 14 and 16. The bits $b_1$ and $b_2$ are respectively applied to the inputs 17 and 18 of the AND gates 14 and 16, and they will pass through to their respective outputs and to the corresponding bit inputs of the D/A converter 12 as long as the other inputs 44 and 46 of the AND gates 14 and 16 are held in a high state. These inputs are connected to the output of the NAND gate 42 and will be in a high state whenever either input to the NAND gate 42 is in a low state. One input of the NAND gate 42 is connected to the output of the velocity decoder 38 and, as previously stated, it will be low whenever the rotational speed of the motor M is greater than some small predetermined amount. The other input lead of the NAND gate 42 is connected to the output 40 of the D/A converter 12, and it is low whenever the count applied to the D/A converter 12 is other than zero. Thus, if the motor M is moving or has not reached the desired angular position so that the error count is other than zero, all bits $b_1$ through $b_7$ are transferred from the error register 6 to the D/A converter 12 as required.

Both inputs of the NAND gate 42 will be in a high state and its output in a low state whenever the digital input to the D/A converter 12 represents zero, indicating that the motor has reached the desired position, and the output of the velocity decoder 38 is high, indicating that the motor M is at rest. This condition blocks the transfer of the bits $b_1$ and $b_2$ from the output of the error register 6 to the input of the D/A converter 12.

Therefore, when the restoring torque turns the disc 24 so that the dividing line 35 between the sectors $s_1$ and $s_2$ passes through the point $A_1$, a pulse appears on the lead CL' and at one input of the OR gate 4. Just prior to this time, both inputs of the OR gate 4 were low so that its output was low, but the presence of a pulse on the lead CL' causes the output to go high and make the count in the error register 6 equal to unity, as indicated at E in FIG. 1B. If this count were transferred to the input of the D/A converter 12, it would, as previously explained, cause hunting, but because it is not transferred for the reasons just explained, no hunting occurs. A pulse occurs on lead CCL' just after a pulse on CL', but the decoder 38 detects these alternating inputs in such manner that its output remains high and keeps the output of the NAND gate 42 low and the outputs of the AND gates 14 and 16 low.

In FIG. 1A, it was assumed that the restoring torque moved the line of demarcation of the sectors $s_1$ and $s_2$ to the dotted line 36. Under this condition, the bit output $b_2$ could be directly connected to an input of the D/A converter 12, but if the torque were greater, the line of demarcation 35 could rotate to a dotted line 36' and change the count in the error register 6 to two, as indicated at E' in FIG. 1B. This error is prevented from causing hunting by transferring a bit at the bit output $b_2$ of the error register 6 to the input of the D/A converter 12 via the AND gate 16, as shown. Additional bits may be disabled to allow for a greater restoring torque.

What is claimed is:

1. A digital servo system for controlling the rotation of a motor through a predetermined number of angular increments in response to a series of command pulses, comprising
    means for counting a series of command pulses,
    a motor,
    means for producing a number of position pulses proportional to the number of angular increments through which said motor has rotated,
    means for deriving a digital signal representing the difference between the number of command pulses and the number of position pulses,
    means responsive to said digital signal for applying control voltage to said motor,
    means for providing a first signal when said motor is at rest,
    means for providing a second signal when said digital signal representation is zero, and
    means for preventing at least one of the least significant bits of said digital representation from reaching the means responsive to the digital representation for applying a control voltage to said motor when said first signal indicates the motor is essentially at rest and the second signal indicates that the digital signal represents a zero count.

* * * * *